(12) United States Patent
Glatt et al.

(10) Patent No.: US 7,962,575 B2
(45) Date of Patent: Jun. 14, 2011

(54) SYSTEM AND METHOD FOR DATA SYNCHRONIZATION BETWEEN DEVICES

(75) Inventors: Darin C. Glatt, Beaverton, OR (US); Steven W. Richardson, Tigard, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 1762 days.

(21) Appl. No.: 10/700,083

(22) Filed: Nov. 3, 2003

(65) Prior Publication Data
US 2005/0097225 A1 May 5, 2005

(51) Int. Cl.
*G06F 13/00* (2006.01)
(52) U.S. Cl. ......... 709/219; 709/225; 709/228; 709/248
(58) Field of Classification Search .................. 709/217, 709/219, 223, 225, 227, 228, 250
See application file for complete search history.

(56) References Cited

U.S. PATENT DOCUMENTS

| | | | | |
|---|---|---|---|---|
| 6,131,096 A | * | 10/2000 | Ng et al. | 707/10 |
| 6,404,884 B1 | * | 6/2002 | Marwell et al. | 379/265.13 |
| 6,810,405 B1 | * | 10/2004 | LaRue et al. | 707/201 |
| 7,849,409 B2 | * | 12/2010 | Fishman | 715/745 |
| 2004/0110497 A1 | * | 6/2004 | Little | 455/418 |

* cited by examiner

*Primary Examiner* — Viet Vu
(74) *Attorney, Agent, or Firm* — Sofer & Haroun, LLP (57) ABSTRACT

In configuring data synchronization between two devices, the first device generates a user configuration interface to be presented on the second device. The user interface elicits information from a user regarding a personal information manager (PIM) that is installed on the second device. This information is transmitted to the first device, which downloads to the second device a synchronization application package based on the PIM. The user interface installs the synchronization application on the second device, obtains information regarding data to be synchronized, and transmits that information to the synchronization application. This information may include names and locations of folders to be synchronized and synchronization preferences such as synchronization direction and schedule. The devices may include servers, PCs, PDAs, handheld computers, and wireless phones. The server may be network-based, accessible via the Internet, a LAN, or the PSTN. Alternatively, the connection between the devices may be local or dedicated, and wired or wireless.

28 Claims, 8 Drawing Sheets

SYSTEM AND METHOD FOR DATA SYNCHRONIZATION BETWEEN DEVICES

BACKGROUND OF THE INVENTION

The invention relates generally to data and database synchronization. More specifically, the invention relates to a system and method for configuring database synchronization, e.g., through an information/call center.

People who use personal information managers (PIMs) such as Microsoft Outlook®, Palm OS®, or Lotus Notes® often store their information in more than one location, such as a PDA (personal digital assistant), a PC (personal computer), a handheld computer, a mobile phone, or a network server. Generally, data is inputted into the location that is most accessible to a user at the time it is being input. Some users may have a default storage location or a backup storage location. In order to make sure that each data location includes identical, up-to-date information, a user synchronizes the data among the various data locations.

Figure 1A:
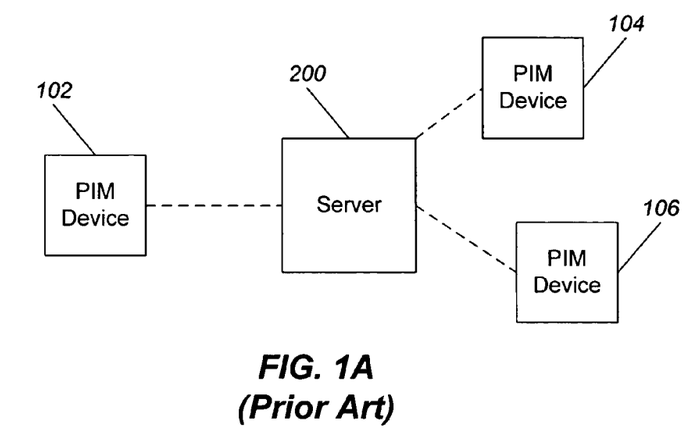
FIG. 1A is a block diagram illustrating a prior art synchronization system.

For example, during a workday a user may carry around a PDA that contains a calendar, a to-do list, contacts lists, and e-mail. During the day, the user may add, revise, or delete an appointment, a to-do list item, or a contact to the PDA, but that new or revised information only appears on the PDA. In addition, e-mail may be received at a home or office PC or both. When the user returns to his or her office or home, the user wants to make sure the changes made to the PDA are reflected on both the office and home PCs, and, if the office or home PC is connected to a server, to make sure that the server also contains the most recent changes. In addition, the user may want to update the e-mail residing on the PDA with newly received e-mail on the home or office PC and/or server. In order to keep each data location current, the user must synchronize the data locations. A typical arrangement, as illustrated in FIG. 1A, for both data security and convenience reasons, is for each user to have a single, default storage location, e.g., server 200, to which data changes are uploaded from a location (e.g., PIM device 102) and compiled, and from which those changes are then downloaded to each of other locations, e.g., PIM devices 104, 106. Typically, this default location is a server accessible through a network such as the Internet or a LAN (local area network), or at least accessible via telephone and the PSTN (public switched telephone network).

Before synchronization between the default server and the other locations can be accomplished, a user typically carries out several steps to configure the various data locations to be able to talk to the default server. First, a user accesses the default server (e.g., by logging on with an account name and password) and downloads a synchronization package (software programs) such as Intellisync® from Pumatech, Inc., of San Jose, Calif. This package includes a synchronization (sync) engine, a synchronization application, a configuration interface, and a "connector" program. A connector program allows users to synchronize between a server application and commercial PIMs. Next, the user exits the server and installs the synchronization package on the PDA, PC, handheld computer, or mobile phone. Then, using the configuration interface, the user accesses the synchronization application and configures the synchronization application for the specific system setup. This setup includes specifying to the synchronization application, e.g., the user's account name and password for the default server (a.k.a. the synchronization server), which folders at that location should be synchronized, which PIM is being used on the user's device, where the data to be synchronized is stored on the user's device, which direction to synchronize the data, and a synchronization schedule.

Figure 1B:
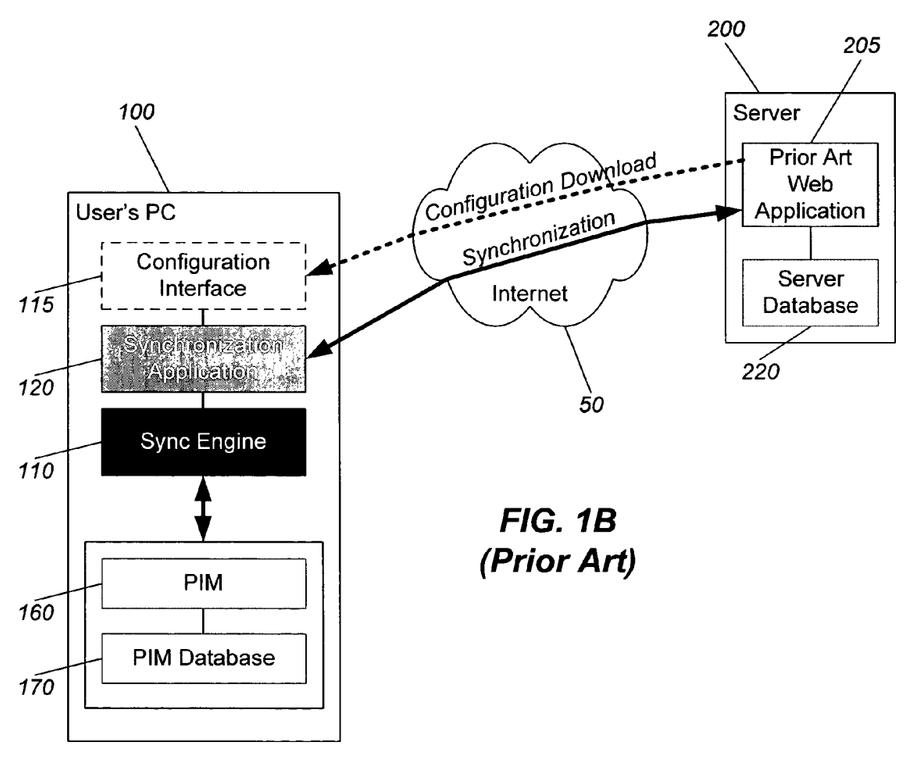
FIG. 1B is a block diagram illustrating the interaction among components involved in configuring a device in a prior art synchronization system.

Referring to FIG. 1B, a prior art configuration of a PIM device (e.g., user's PC 100) to prepare it for the synchronization process involves the user first logging onto the web-based server's website to access prior art web application 205. (A web application is a software application that is accessible from the Internet.) The user then downloads a synchronization package from server 200 over the Internet 50. The synchronization package includes synchronization application 120, sync engine 110, and configuration interface 115 (the connector is also included, but is not shown). Next, the user exits server 200 and installs the synchronization package components on PC 100. Once the synchronization package components are installed, the user configures synchronization application 120 using configuration interface 115. Configuration includes informing the synchronization application of the user's account name and password for server 200, which items (calendar, address book, e-mail, etc.) the user wants to synchronize to user's PC 100, which PIM 160, e.g., Microsoft Outlook, the user has installed on PC 100, the locations on PC 100 of the PIM's address book, calendar, and e-mail folders, which direction to synchronize the data, e.g., bidirectionally between server 200 and PC 100, and on what schedule synchronization should occur, e.g., once per day, once per week, etc. Once this configuration is completed, configuration interface 115 is no longer needed. Then, based on the synchronization schedule, synchronization application 120 uses the user's account number and password to log on to web server 200 and prior art web application 205 via the Internet 50 and uses sync engine 110 to synchronize server database 220 on web server 200 with PIM database 170 on PC 100. This process is currently used to configure synchronization between, e.g., a user's PDA or PC and data stored in a web-based server account, such as Yahoo!® or MSN®.

The prior art configuration process has several disadvantages. First, a user must confront two completely different interfaces: a web-based interface, in order to create contacts and calendar folders on the server side and to interact with prior art web application 205 to download the synchronization package, and then a Windows-based interface, in order to install the synchronization components and to configure synchronization application 120. Second, many of the steps to configure a folder for synchronization are complicated and must be performed in the proper sequence. Third, some of the steps used in configuring synchronization application 120 are repeated when accessing prior art web application 205. In all, this configuration process can be very tedious and confusing.

SUMMARY OF THE INVENTION

The invention streamlines the synchronization configuration process by providing a novel web-based user interface that accepts settings from the user and then transfers those settings to both a server and the synchronization application, where appropriate, thereby presenting to the user a single interface.

The method for configuring data synchronization between two devices includes generating a user interface on the second device, which user interface is programmed to elicit from a user information identifying which PIM is being used on the second device and information to configure the synchronization application. There is a communication connection between the first and second devices. The communication connection may be wired or wireless, and may be a direct connection or via a network. The user interface is generated based on instructions transmitted to the second device via this communication connection. Also transmitted via the communication connection is the PIM-identifying information to the first device, and a synchronization package to the second device, which synchronization package is chosen based on the PIM-identifying information. The synchronization package includes a synchronization application that is installed on the second device. The information used to configure the synchronization application ("synchronization information") is provided from the user interface to the synchronization application. Preferably, the synchronization information is provided to the synchronization application via a component object model (COM) interface.

The PIM-identifying information may be provided by the user or it may be determined by the first device or user interface by detecting settings on the second device. Synchronization information may include folder names and/or locations and synchronization preferences such as synchronization direction and synchronization schedule.

The devices on which the data is synchronized may include servers, PCs, PDAs, handheld computers, and wireless phones. The devices may be network-based, accessible via the Internet, a LAN, or the PSTN. Alternatively, the connection between the devices may be local or dedicated, and wired or wireless. The method may include having a user log on to at least one of the devices to provide identifying information, such as a username and/or password.

Another aspect of the invention involves a server accessible through an information assistance service configuring another device to perform data synchronization with the server. A user interface is generated on the device, and the user interface obtains information identifying the PIM used on the other device. A synchronization package based on the PIM-identifying information is then provided (such as by downloading) and installed on the other device. The synchronization package includes a synchronization application and a connector application, where the connector application is adapted for use with the PIM. The user interface obtains synchronization information, such as folder names and locations, and provides this information to the synchronization application. The server may be accessible via a network such as the Internet or the PSTN.

Advantageously, the invention allows the web-based user interface to present the settings used to configure the user-side synchronization application, and thus presents to the user only one interface for configuration rather than two as in the prior art.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The present invention is directed to streamlining the configuration of a PIM device for synchronizing its data with other PIMs through a server. Like the prior art configuration process, a configuration process according to the present invention involves logging onto the location where the data resides (e.g., a server) and installing and configuring a synchronization application on the PIM device whose data is to be synchronized (e.g., a user's PC or client). Unlike the prior art configuration process, the inventive configuration process uses a single interface communication layer to simplify the process. In addition, configuration components that were accessed using the prior art Windows-based interface of the synchronization application are moved to the web-based interface, and both the server-side and the client-side settings are presented by this single, web-based user interface. Once the configuration is completed, synchronization can occur.

Figure 2A:
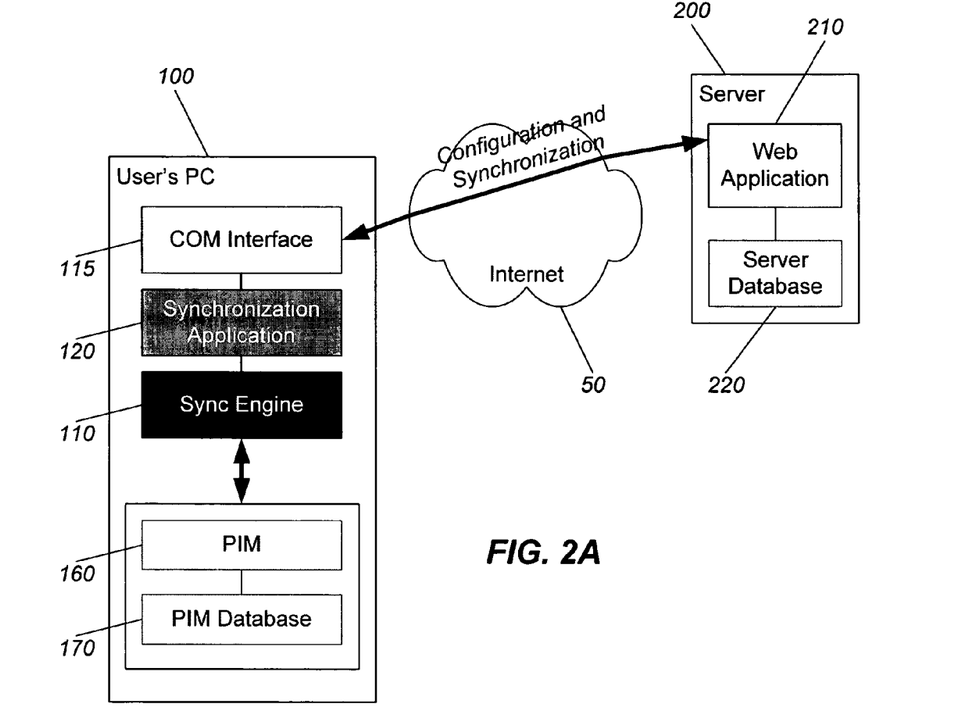
FIG. 2A is a block diagram illustrating the interaction among components involved in configuring a device for synchronization in accordance with an embodiment of the invention.

FIG. 2A illustrates components involved in a synchronization configuration process according to the present invention. The server side includes server 200 and a new web application 210. The client side or user side includes sync engine 110 and synchronization application 120 as in FIG. 1B. Unlike the prior art, however, the client side includes a COM layer 130, and does not include configuration interface 115. "COM" stands for "component object model," which is Microsoft's framework for interoperation of distributed objects in a network. COM is an interface for allowing two pieces of software to communicate. COM provides similar capabilities to those defined in the Common Object Request Broker Architecture (CORBA), a framework that is supported by other major companies in the computer industry. COM provides for negotiation between interfaces, determining when an object can be removed from a system, and putting one object into service as the result of an event that has happened to another object. COM may also provide a set of interfaces allowing clients and servers to communicate within the same computer. COM may also include other interfaces and programming tools such as COM+(an extension of COM), DCOM ("distributed component object model"), and ActiveX interfaces and programming tools. In essence, the invention uses the COM layer as an interface between web application 210 and synchronization application 120 to allow a user to only have to interface with one software environment.

Figure 2B:
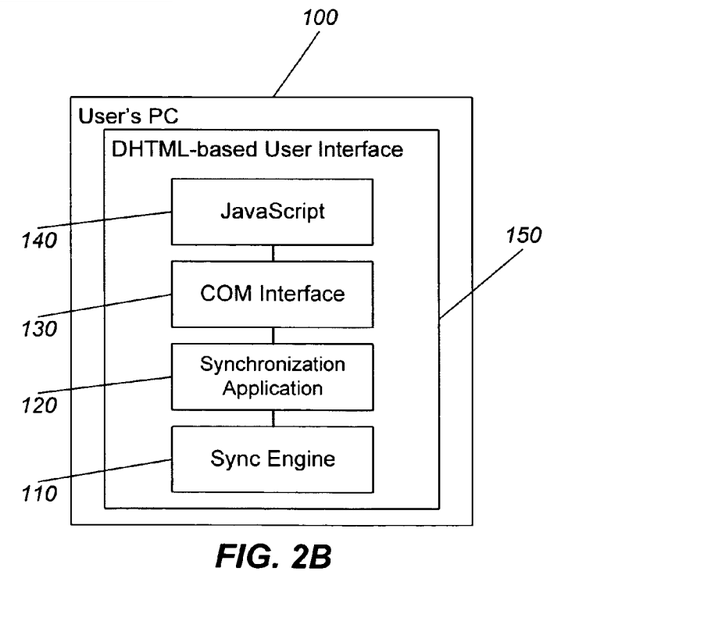
FIG. 2B is a schematic diagram illustrating various layers within a user interface in accordance with an embodiment of the invention.

In implementing the configuration process, and because web application 210 is offered via a website, it may be desirable to present to the user a web-based, user-friendly user interface, such as that offered by DHTML (dynamic hypertext markup language). A schematic diagram illustrating various layers making up such a user interface is shown in FIG. 2B. The user sees a DHTML-based user interface 150 that interacts with JavaScript 140. JavaScript 140 is used to interact with COM interface layer 130, converting user interaction (such as data input) to calls to a COM object. By passing variables from layer to layer, these interface layers allow the user to interact only with a web-based interface to configure synchronization application 120 in the invention as compared to the prior art in which the user had to interact with a web-based interface and then had to separately interact directly with the synchronization application to configure it. Examples of a web-based interface are shown in FIGS. 4A and 4B, whose details will be explained below.

Figure 3:
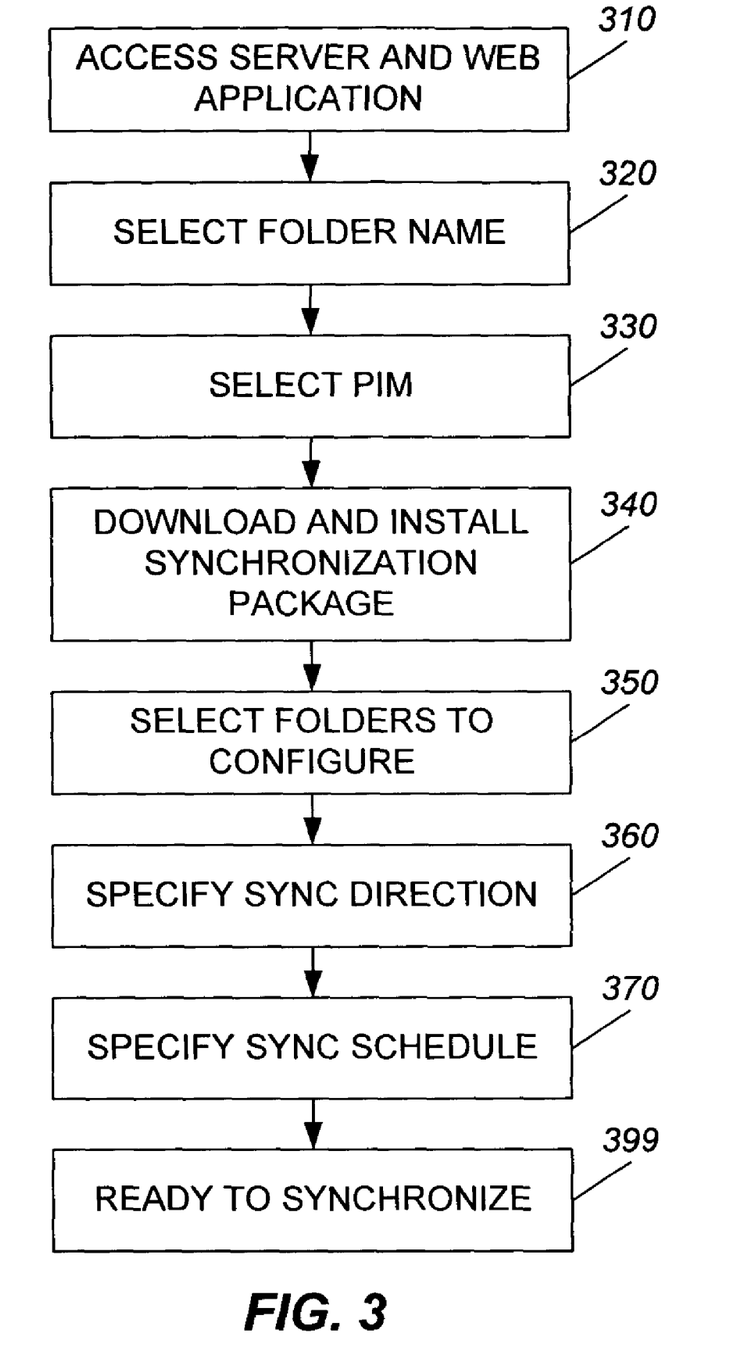
FIG. 3 is a flowchart illustrating a routine for configuring the synchronization process in accordance with an embodiment of the invention.

FIG. 3 is a flowchart illustrating one way to configure the synchronization process. Illustratively, it uses the example of a default server 200 that has its data stored in server database 220, and a user who wants to configure synchronization between a device, such as a PDA or a PC 100, and server 200. The configuration process includes logging on to server 200 and using web application 210, which transmits instructions to PC 100 to generate the appropriate DHTML and JavaScript interfaces, identifying to the user interface the PIM that the device is using, downloading the synchronization application from the server and installing it on the device, selecting the folders which with to synchronize, and several other parameters.

More specifically, in step 310, the user accesses server 200 such as by logging on with a username and password. After logging on to server 200, web application 210 transmits instructions to PC 100 to generate web-based user interface 150, and user interface 150 appears to the user as shown in screen shots 420 and 450 in FIGS. 4A and 4B. On the left side of the screens are function links, which indicate to a user how much progress is being made in the configuration process. The first function link, "Folder Name," is performed in step 320, in which the user selects the folder or folders in server database 220 to synchronize to (a user may have one or more contacts folders, calendar folders, e-mail folders, etc.). This information is transmitted by user interface 150 to server 200 to inform the server to which folder the data should be synchronized. This folder name information does not have to be transmitted immediately during the configuration process. It may be retained by user interface 150 to be transmitted later during the actual synchronization process.

Figure 4A:
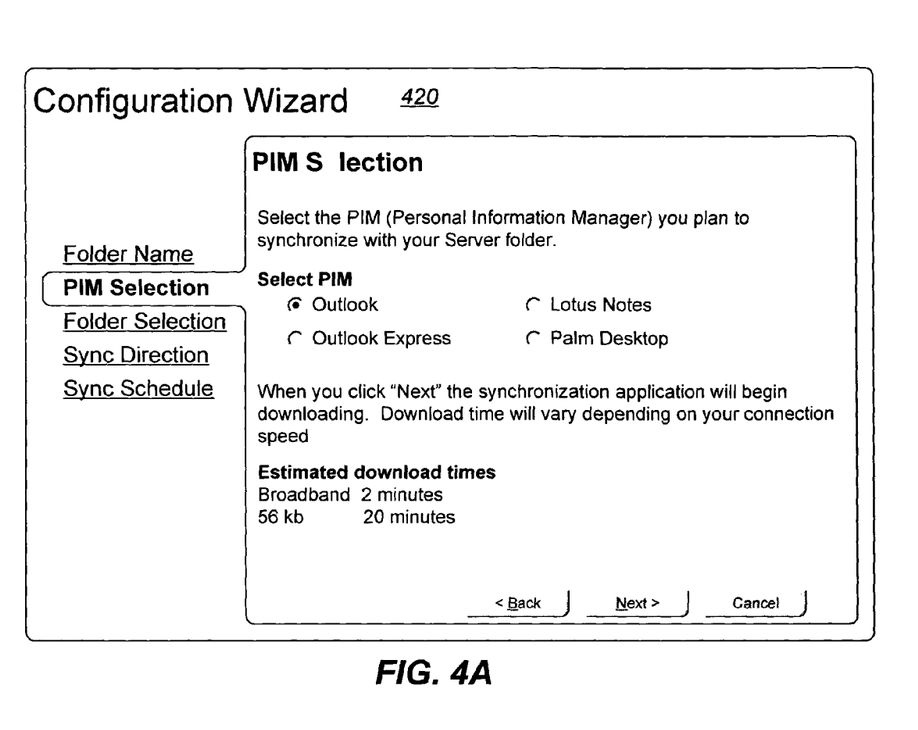
FIGS. 4A and 4B are screen shots encountered by a user during a configuration process in accordance with an embodiment of the invention.
Figure 4B:
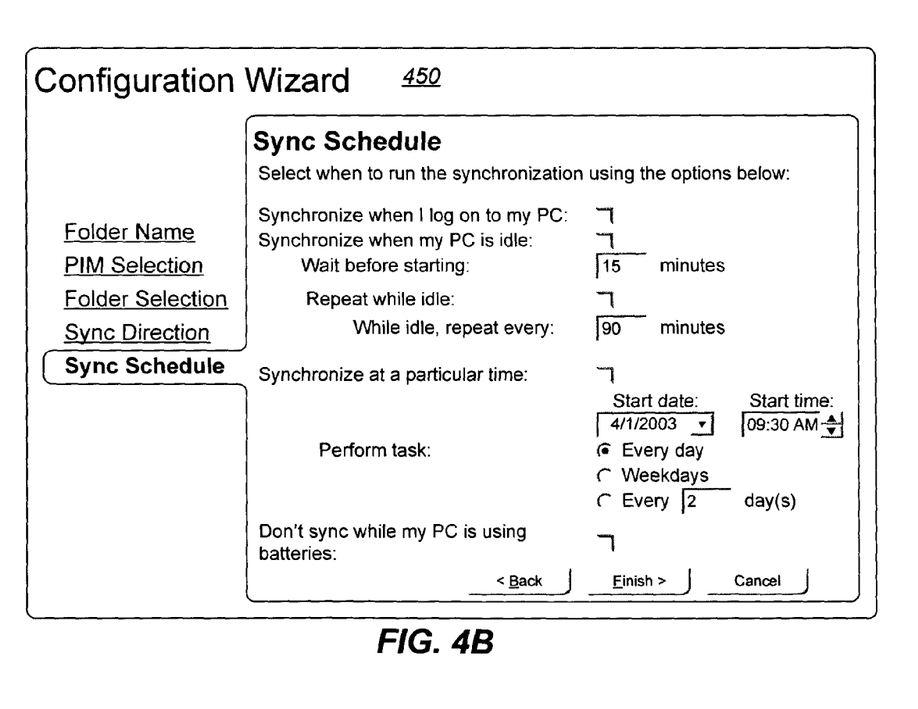

Screen shot 420 in FIG. 4A illustrates steps 330 and 340. Step 330 asks the user which PIM the user has on the device. Choices here may be Microsoft Outlook, Outlook Express, Lotus Notes, Palm OS, Palm Desktop, or other PIMs. The user indicates to user interface 150 the appropriate PIM. Alternatively, user interface 150 may be set up to recognize the PIM used on the device by detecting settings on the user's device. This PIM-identifying information is transmitted to server 200, which then downloads a synchronization package to the user's device in step 340, and user interface 150 installs the synchronization package on the user's device. The major components of the synchronization package are sync engine 110, synchronization application 120, and a connector application, which is specific for the chosen PIM, but no configuration interface is downloaded. These actions are similar to those performed in the prior art, but here the user merely performs one step, indicating to user interface 150 the PIM loaded on the device, and the user interface, interacting with JavaScript layer 140 and COM interface 130, takes care of the rest of the installation and configuration activity. User interface 150 determines that the PIM information is to be transmitted to server 200 and the synchronization package is to be downloaded to the user's device and then installed on the user's device. In the prior art, the user performed multiple steps, exiting the web-based interface and separately installing the synchronization package and configuring the synchronization application with no help from the prior art web-based interface or web application.

Once the synchronization application is installed, the user in step 350 ("Folder Selection" on the left side of screen shots 420, 450) selects which PIM folder to configure (i.e., which PIM folder corresponds to the calendar, contacts, or e-mail folder name selected in step 320) by indicating to user interface 150 the location of the folder. User interface 150 transmits this information to synchronization application 120 to be stored for when the synchronization process begins. An example of a contacts folder is "Mailbox—John Doe\Contacts." Depending on which PIM is selected, the configuration application may present to the user a default folder. For Microsoft Outlook, the folder name may default to the Outlook default profile or default folder. For Outlook Express, the folder name may default to the default database of the default identity. For Palm, the folder name may default to the default database for the default user. For Lotus Notes, the folder name may default to the last used database.

In step 360, the user specifies to user interface 150 the synchronization direction (corresponding to "Sync Direction" on the left side of screen shots 420, 450). User interface 150, via JavaScript layer 140 and COM interface 130, transmits this information to synchronization application 120, which stores the information and retrieves it when the synchronization process begins. The direction may be bi-directional, i.e., to synchronize both ways—from server 200 to the device and vice versa, unidirectional, i.e., one way from server 200 to the device, or one way the other way, from the device to server 200. Two-way synchronization will generally be used, especially if data can be input or revised in both places, the server and the device. One-way synchronization may typically be used if the server or the device is used as a read-only or backup storage location.

Screen shot 450 in FIG. 4B illustrates step 370, in which the user sets the synchronization schedule. This may involve scheduling synchronization for a particular date and time (e.g., April 1st, 9:30 AM) or specifying synchronization to occur automatically upon the occurrence of an event, such as when the user logs on to the device or when the device is idle for a period of time. The user may also schedule synchronization to occur regularly or periodically, such as every 10 minutes, once a day, every 2nd or 3rd day, weekly, etc. The user may also indicate exceptions to automatic synchronization, such as not to synchronize on weekends or if the PC is operating on battery power. Once this data is input to user interface 150, the user interface transmits the data, via JavaScript layer 140 and COM interface 130, to synchronization application 120. Synchronization application 120 then schedules synchronizations based upon this information. Once these steps are taken, the user is ready to synchronize the databases, as indicated by step 399.

Figure 5A:
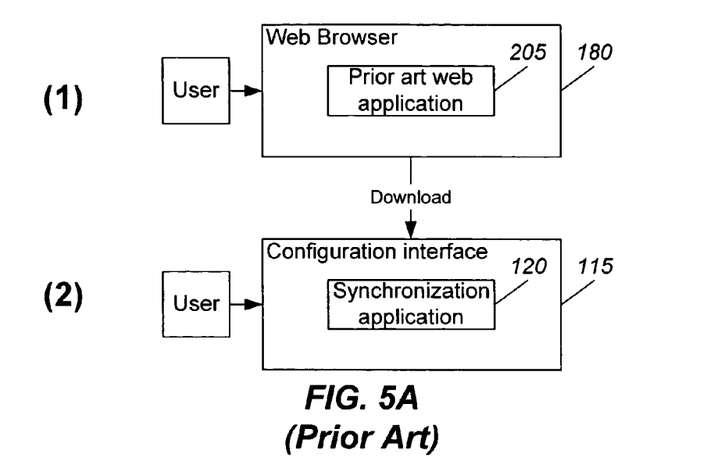
FIGS. 5A and 5B are schematic flowcharts illustrating the prior art user interfaces and an interface in accordance with an embodiment of the invention.
Figure 5B:
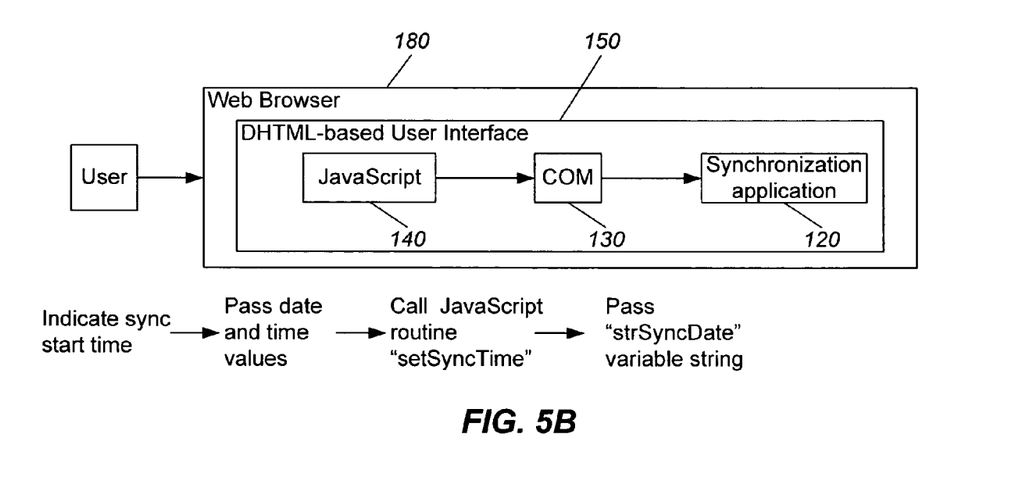

The invention differs from the prior art in the manner in which the synchronization application and the server receive information from the user during the configuration process. As depicted in FIG. 5A, in the prior art, in step (1) the user opens web browser 180 on PC 100, accesses server 200, and encounters a web-based interface. The user provides information to the web-based interface and to prior art web application 205, which downloads a synchronization package, including a configuration interface, to PC 100. Then, in step (2), the user opens on PC 100 configuration interface 115 and provides it synchronization information, some of it the same as in step (1), and configuration interface 115 provides that synchronization information to synchronization application 120. This step (2) is performed on the user's side only. This prior art process was complex for the user because it required separate configuration steps and two interfaces to deal with. In contrast, as depicted in FIG. 5B, with the invention, the user provides information only once, to DHTML user interface 150 via web browser 180, and encounters only one interface. User interface 150, in turn, provides some of the information to server 200 to download and install the synchronization package on the user's device. User interface 150 provides other of the information to synchronization application 120 via JavaScript 140 and COM 130 interface layers. The information flow between DHTML interface 150 and synchronization application 120 includes folder name and location, synchronization status information, default local folder location, folder changes, profile changes, synchronization direction, synchronization scheduling, and initiating the synchronization process itself. One example of this information flow, setting the synchronization time, is shown accompanying the flowchart in FIG. 5B. First, the user indicates a sync start time of, e.g., Apr. 1, 2003, 9:30 AM. These date and time values are passed via DHTML user interface 150 to JavaScript 140. Then, a JavaScript routine called "setSyncTime," which takes the date and time values as parameters, is called to set the synchronization time in the COM interface. The date and time values are then passed as "strSyncDate" variable string in a call from COM interface 130 to synchronization application 120.

One type of environment in which the present invention is useful is that of an information/call center environment. In this environment, a central database acting as server database 220 stores a user's contacts, addresses, calendars, and to-do items, and the system is capable of synchronizing the information in the server database with a user's PC, PDA, wireless phone, or other device. The invention is useful in this environment because it reduces the time and complexity involved in configuring the synchronization process. Having the information stored in an information/call center environment facilitates another way to store and retrieve information, i.e., over the telephone lines using a call center operator. The interaction in this environment will now be described.

In a typical directory assistance call, a caller identifies to the operator the name and address (sometimes city or area code) of a party whose telephone number is desired. In response, the operator locates the desired destination telephone number using, e.g., a computer database. The destination number is then provided to the caller, e.g., by a voice server which provides automated voicing of the number, and the caller is afforded an option to be connected to the destination number without the need of first terminating the directory assistance call.

Information assistance is an extension of directory assistance. In addition to connecting a caller to a destination number, information assistance operators can provide concierge-type services such as a restaurant guide and reservation service, event ticketing and reservation service, hotel reservation and availability service, travel or flight reservation and ticketing services, ordering specific items such as flowers or food delivery, arranging transportation, and accessing entertainment guides. The use of information assistance to provide such concierge-type services is disclosed, e.g., in commonly-assigned, co-pending U.S. application Ser. No. 09/520,306, "Technique for Providing Information Assistance Including Concierge-Type Services," filed Mar. 7, 2000, incorporated herein by reference.

In addition, if a caller subscribes to an information assistance service, the information assistance service may develop one or more user profiles that include information pertaining to and about the caller, including preferences for handling calls from the caller and methods of identifying the caller based on the caller's telephone number, voiceprint, PIN (personal identification number), etc. These profiles may also include the caller's personal preferences about restaurants, movies, sporting events, or hobbies. It should noted at this point that the methodology for identifying a caller using his/her voiceprint is fully described, e.g., in copending, commonly assigned U.S. application Ser. No. 10/403,207, filed on Mar. 31, 2003, incorporated herein by reference.

Moreover, information assistance service subscribers may use an information management service to retain information folders, such as contacts folders (also known as private directories), appointments folders (also known as calendars), to-do lists, and notes. A caller may access a contacts folder to connect to a desired contact, retrieve an appointment or to-do list item, or set up a new contact, appointment, or to-do list item. A contacts folder contains contact information, such as telephone number, postal address, and e-mail address, for people and/or organizations. Each of the user's contacts includes at least a telephone number, and likely includes an associated name, which may be a full or real name of the contact (e.g., Joseph Johnson) or may be a nickname or alias (e.g., Joe or "JJ"). The associated address may be a full address, including number, street, city, state, postal code, and country, or may be a partial address, e.g., only including a street name or a city. A user may have separate contacts folders for different purposes, such as a personal contacts folder, a business contacts folder, a sports team contacts folder, etc. These folders are stored in a database accessible to an information/call center and its operators. The user may have specific rights with respect to a folder, e.g., owner, administrator, read-only, etc. When the user accesses a folder through an operator, the operator becomes an alter ego of the user and is subject to the same rights as the user with respect to the folder. The user may create, maintain, or access a contacts folder via the Internet or other communications means, or through an operator who in turn may create, maintain, or access the folder on behalf of the user. The user may be identified by an ANI (automatic number identification) or, alternatively, by, or in combination with, a user identification (ID), password, PIN, mother's maiden name, user voice recognition, user voiceprint, etc. The use of information assistance to provide these types of information management services and to maintain the folders is disclosed, e.g., in U.S. Pub. No. 2002/0055351 A1, published May 9, 2002, incorporated herein by reference. It is generally this information management service part of the information assistance service that is relevant to the present invention.

An expansive network of information/call centers may be used from which operators can effectively provide users with personalized information and communications services. Such services may include, e.g., providing directory information, movie listings, restaurant recommendations, driving directions to various places, etc.; making reservations; sending invitations; administering appointment calendars; ticketing; and conducting other transactions for the users. The term "operator" used herein broadly encompasses entities that are capable of providing information assistance in a telecommunications environment, including, without limitation, human operators, voice response/recognition capabilities, web-/WAP-enabled operator services, and other automated and electronic access.

Figure 6:
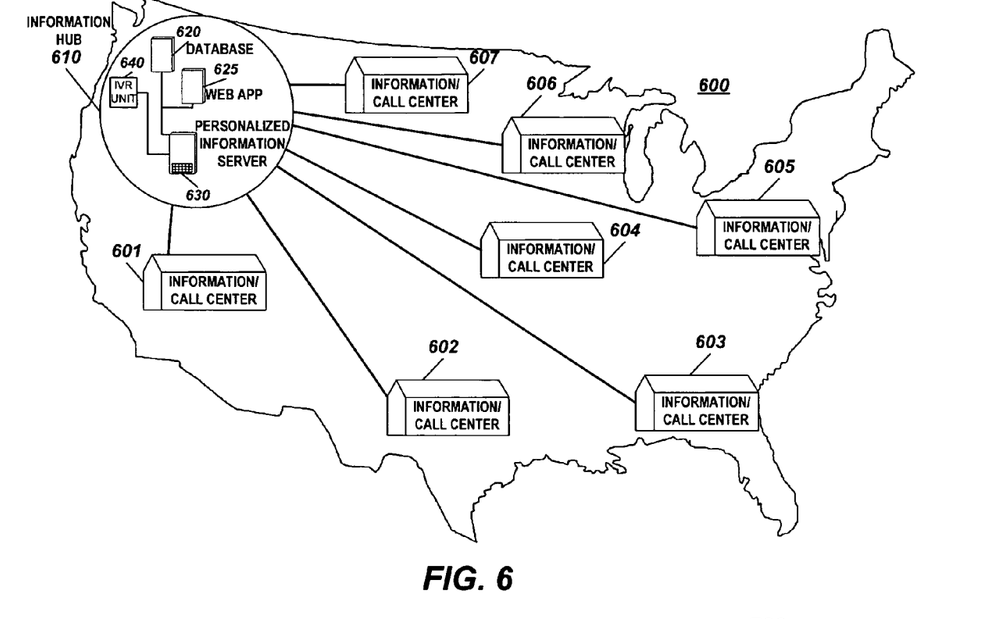
FIG. 6 illustrates a communications system including information/call centers in accordance with an embodiment of the invention.

FIG. 6 illustrates a system embodying aspects of the invention, which includes wide area network (WAN) 600 covering an extensive area. WAN 600 can be an intranet-based network or an Internet-based network such as the World Wide Web. In this illustrative embodiment, WAN 600 connects operators dispersed throughout a wide coverage area in information/call centers 601-607. Each of information/call centers 601-607 covers one or more regional coverage areas. One or more information hubs 610 are also included in WAN 600. An information hub 610 includes one or more personalized information servers 630 which are accessible by the operators in the system and one or more databases 620 in which users' contacts, appointments, and other folders and information are stored and maintained. Personalized information server 630 acts as server 200 in FIGS. 1A, 1B, 2A, and 3, and database 620 acts as server database 220 in FIGS. 1B and 2A. Web application 625 in information hub 610 acts as web application 210 in FIGS. 2A, 3, and 5B. Information hub 610 may also include interactive voice response (IVR) unit 640 connected to server 630 for interacting with the user by voice, e.g., announcing to the user selected appointments. In addition to storing folders and information in information hub 610, they may also be stored locally at one or more of the information/call centers. The folders and information at different centers are synchronized with each other. Synchronized databases provide necessary backup as well as support to roaming mobile device users.

In operation, a user dials a designated access number, e.g., "411," "*555," "555-1212," "00," etc., and the call is routed to, say, information/call center 601 where an operator attends to the call. The user may be identified by an ANI (automatic number identification) or, alternatively, by, or in combination with, a user identification (ID), password, PIN (personal identification number), mother's maiden name, user voice recognition, user voiceprint, etc. In the case in which the user desires an information assistance service, such as a directory assistance, information management, or concierge-type service, the user makes such a request to the operator and the operator accesses personalized information server 630 through WAN 600 (or alternatively via the Internet). In response, server 630 presents on the operator's terminal various graphical user interface (GUI) dialog boxes, e.g., "login" (for confirming the user's identity via User ID and password), "home" (listing the user's contacts, appointments, and other folders), "edit" (for editing specific folder contents), and "view" (for viewing folder contents), for interacting with the operator.

Figure 7:
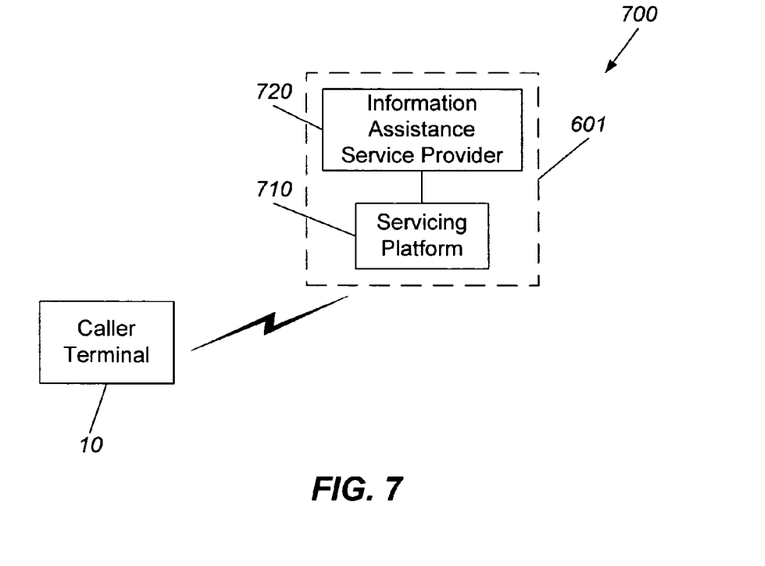
FIG. 7 illustrates an arrangement including a caller terminal and an information/call center in accordance with an embodiment of the invention.

FIG. 7 illustrates system 700 in which a caller initiates an information assistance call from caller terminal 10, which is routed to, say, information/call center 601 via one or more carrier switches in a carrier network, e.g., a public switched telephone network (PSTN), a wireless telephone network, etc. Information/call center 601 generically represents any of the aforementioned information/call centers 601-607 shown in FIG. 6. Caller terminal 10 may comprise a wireless telephone, wireline telephone, personal digital assistant (PDA), computer, or other communication device. In this illustrative embodiment, users may dial, speak or otherwise communicate predetermined access digits, access codes or retail numbers, or input a predetermined address or URL (uniform resource locator) established by the carrier to access information/call center 601. In the example described above, the predetermined access digits may be "411," "*555," "555-1212," "00," etc. Once connected to information/call center 601, the user requests information assistance.

Figure 8:
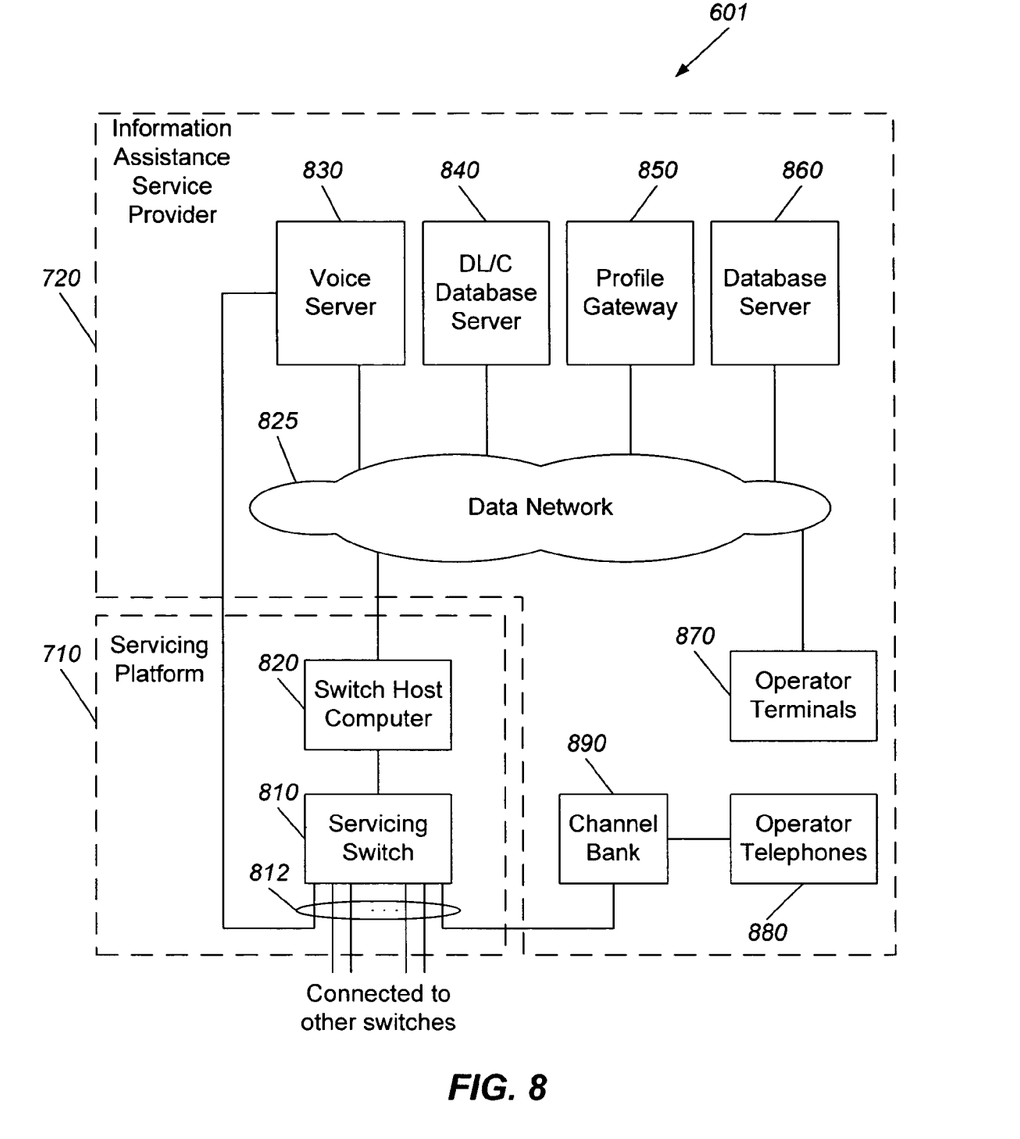
FIG. 8 illustrates an information assistance service provider and a servicing platform for providing an information assistance service.

FIG. 8 illustrates information/call center 601, which may be configured to include information assistance service provider 720 together with servicing platform 710. It should be noted that even though both provider 720 and servicing platform 710 appear in the same figure, they may or may not be located in the same geographic area. Servicing platform 710 includes servicing switch 810 having Ti spans 812 or connections by other means for connection to one or more voice servers 830 (although only one is shown in the figure), channel bank 890, and one or more carrier networks. In an alternate embodiment, voice information may be packetized and transmitted pursuant to a VoIP (voice over IP (Internet Protocol)) protocol over a packet-switched network, e.g., the Internet, to information/call center 601. Servicing switch 810 may receive an incoming information assistance call from a carrier switch in a carrier network. Servicing switch 810 may also be used to place an outgoing call onto a carrier network, which may be different from the carrier network used for the incoming call.

Channel bank 890 in service provider 720 is used to couple multiple operator telephones 880 to servicing switch 810. The operators in information/call center 601 are further equipped with operator terminals 870, each of which includes a video display unit and a keyboard with an associated dialing pad. Operator terminals 870 are connected over data network 825 to one or more database servers 860 (although only one is shown in the figure). Operators may use database server 860 to provide information assistance including searching various databases in a manner described below to satisfy a caller's request. Other information assistance concerning restaurant recommendations, movie listings, events, etc. may also be provided by searching one or more internal and external databases, and the Internet. Switch host computer 820 and voice server 830 are also connected to data network 825. By way of example, data network 825 includes a local area network (LAN) supplemented by a number of point-to-point data links. Through data network 825 and routers (not shown), components of information/call center 601 may also be connected to the Internet or other wide area networks (WANs).

Servicing switch 810 is conventional and supports digital Ti or perhaps other connectivity. The operation of servicing switch 810 is governed by instructions stored in switch host computer 820. In this illustrative embodiment, servicing switch 810 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, voice recognizers, dual-tone multi-frequency (DTMF) generators/detectors, or conference units, depending on the demand placed on information/call center 601 and servicing switch 810 for each corresponding function.

An incoming call requesting information assistance is received by servicing switch 810 in information/call center 601, which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 820 or elsewhere in information/call center 601. In other instances, other distribution logic schemes may be utilized, such as skills-based routing or a priority scheme for preferred users. In a preferred embodiment, when the information assistance call is received by servicing switch 810 in information/call center 601, switch 810 derives, in a well-known manner, from the signaling associated with the call the caller's phone number from which the call originates, known as ANI.

Voice server 830 (also known as a "voice response unit" or "VRU") is used to play the constant repeated parts of an operator's speech, namely, the various greetings and signoffs (or closings) as well as other information portions of a call. Voice server 830 is connected via data network 825 to switch host computer 820 and via one or more Ti spans 812 to servicing switch 810. Voice server 830 may comprise a general-purpose computer and one or more voice cards for voice recognition, voice recording and playback, and call progress analysis. At appropriate stages in a call progression, switch host computer 820 initiates a voice path connection between voice server 830 and servicing switch 810 such that the user, or the user and the operator, are able to hear whatever prerecorded speech is played on that connection by voice server 830. Computer 820 then instructs voice server 830, via data network 825, what type of message to play, and passes data parameters that enable voice server 830 to locate the message appropriate to the call state.

Data network 825 may further connect to directory listing/concierge (DL/C) database server 840. DL/C database server 840 may contain directory listing information on restaurants, events, accommodations, transportation, travel information and booking, stock prices, weather, and other services such as grocery or flower delivery, etc. Together, DL/C database server 840 and database server 860 provide operators with the means to search for a caller's desired party and determine the appropriate telephone number. Preferably, these databases can search not only by name and address, but also by type of goods/services and/or geographical region, or by any other attribute in the caller record, including phone number. For example, DL/C database server 840 can answer queries soliciting the names/numbers of restaurants serving a desired cuisine on a given street.

Data network 825 may also connect to a profile gateway 850. Profile gateway 850 provides access to a user profile, which may include personal information and the subscriber's preferences. Such personal information and preferences may include the subscriber phone number, fax number, e-mail address, preferred restaurant and dining time, preferred mode of delivery of information to him/her, dietary requirements, likes and dislikes, past logged activities, specific service subscriptions, etc. When the information assistance call is received by servicing switch 810 in information/call center 601, switch 810 derives the aforementioned ANI from the call setup signaling associated with the call. Switch host computer 820 then requests via profile gateway 850 any profile identified by such an ANI. An embodiment of profile gateway 850 may include a data network interface, a communications interface, a processor, and memory. Profile data may be input and updated (e.g., via Internet web pages or operator) through a remote profile manager (not shown). Copies of the profile data are distributed to the profile gateways in various information/call centers (e.g., center 601) connected via WAN 600. In response to a request for a profile, the processor in the profile gateway searches the memory (which may include disks, caches, and volatile and nonvolatile memories) for the profile identified by the ANI. When the operator answers the call, computer 820 communicates to components in information assistance service provider 720 and, in particular, the operator through terminal 870 any profile data pertinent to the handling of the call. In this instance, the personal profile may indicate that the user is a subscriber to the information management service described before. In accordance with an aspect of the invention, the user may be afforded the option to send to one or more contacts in a selected contacts folder managed by the information management service the search results or other information forwarded by an information source.

Figure 9:
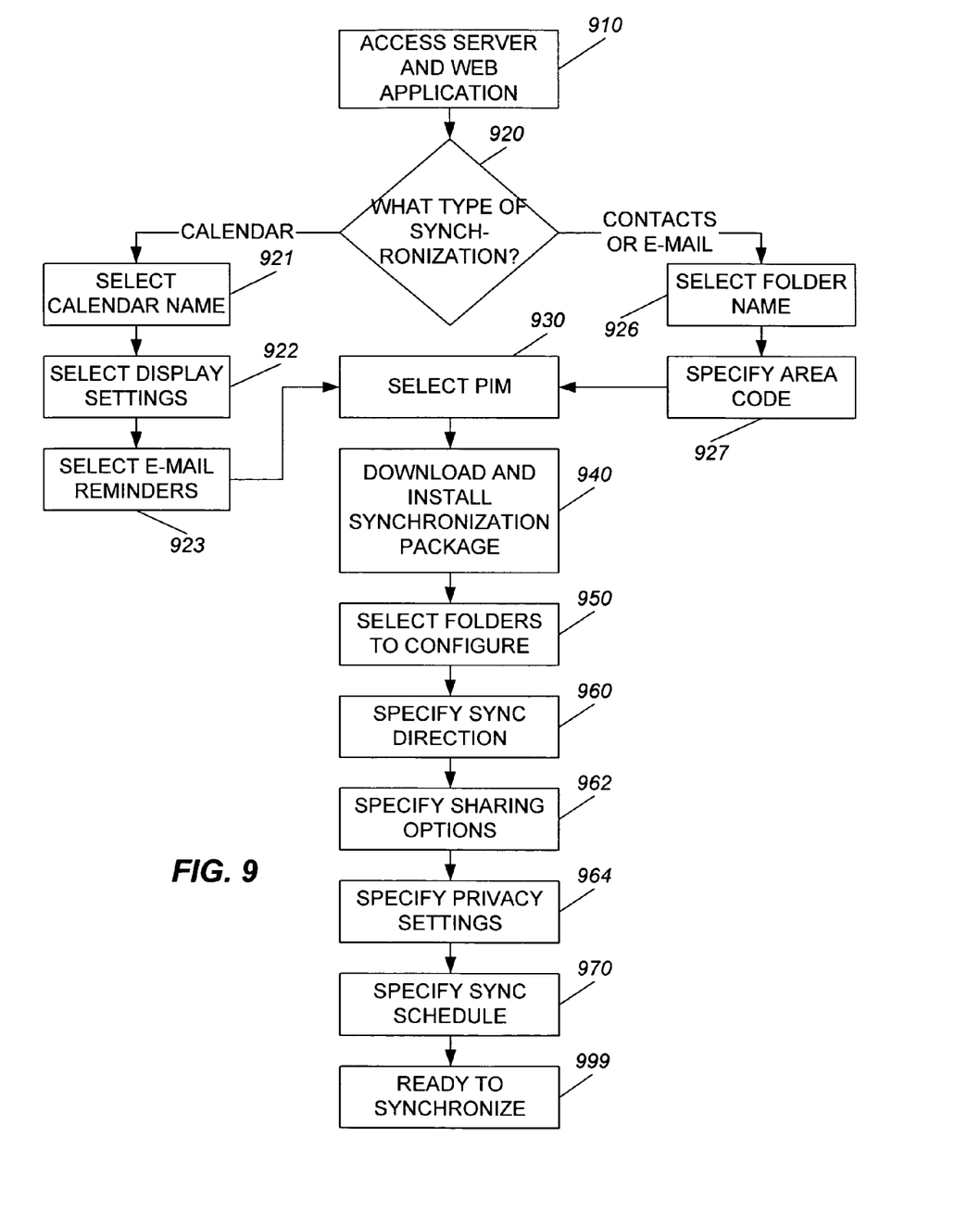
FIG. 9 is a flowchart illustrates a second routine for configuring the synchronization process in accordance with another embodiment of the invention.

The flowchart in FIG. 3 can be adapted to the call center environment as shown in FIG. 9. In step 910, the user accesses personalized information server 630 such as by logging onto the information assistance service website with a username and password. Server 630 has access to web application 625 and database 620, which contains a user's contacts folders, calendars and appointments, to-do list items, and, possibly, e-mail. After logging on to server 630, web application 625 transmits instructions to the user's device (PC, PDA, wireless phone, etc.) to generate web-based user interface 150. If the user has not set up synchronization between the server and the user's device, in step 920 user interface 150 prompts the user for the type of synchronization the user wants to configure. In FIG. 9, calendar, contacts, and e-mail synchronization are shown, but other types of synchronization may exist. If the user is configuring a calendar, step 921 asks the user to select which calendar in server database 620 to synchronize to (a user may have more than one calendar). Step 922 asks the user to set the display settings for the calendar, such as the calendar view (daily, bi-daily, weekly, bi-weekly, monthly, etc.), the appointment display color, and the daily view time interval (5 minutes, 10 minutes, 15 minutes, 30 minutes, etc.) Step 923 then asks if the user wants to receive e-mail reminders about appointments in the calendar, and, if so, to enter a valid e-mail address and the notification options (e.g., all appointments, all appointments with an alarm set). The information elicited in steps 921-923 is generally transmitted from user interface 150 to server 630, and some may be retained by user interface 150 to be transmitted later during the actual synchronization process.

If the user is configuring a contacts folder, step 926 asks the user to select which contacts folder in server database 620 to synchronize to (a user may have more than one contacts folder, e.g., business contacts, personal contacts, clients, sports teams, etc.). If the user is configuring e-mail, the user may have several e-mail folders, e.g., business, personal, organizations, etc. Step 927 asks the user for the user's default area code, which allows the information/call center operators to connect the user to a seven-digit phone number by automatically prepending the area code to the number. The information elicited in steps 926-927 is generally transmitted from user interface 150 to server 630, and some may be retained by user interface 150 to be transmitted later during the actual synchronization process.

After the calendar, contact, and e-mail configuration choices are made, step 930 asks the user which PIM the user has on the device. As with FIGS. 3 and 4A, choices here may be Microsoft Outlook, Outlook Express, Lotus Notes, Palm OS, or other PIMs. The user indicates to user interface 150 the appropriate PIM or user interface 150 detects which PIM the device is using. This PIM-identifying information is transmitted to server 630, which then downloads a synchronization package to the user's device in step 940, and user interface 150 installs the synchronization package on the user's device. As in FIG. 3, sync engine 110, synchronization application 120, and a connector specific for the chosen PIM are downloaded by server 630. Once these components are installed, the user in step 950 selects which PIM folder to configure (i.e., the PIM folder that corresponds to the calendar, contacts, or e-mail folder previously identified in steps 921 or 926), and, depending on which PIM is selected, user interface 150 may present to the user a default folder to use. User interface 150 may also allow the user to change the PIM's profile.

In step 960, the user specifies the synchronization direction—synchronize both ways (from server 630 to the device and vice versa), one way from server 630 to the device, or one way from the device to server 630. User interface 150, via JavaScript layer 140 and COM interface 130, transmits this information to synchronization application 120, which stores the information and retrieves it when the synchronization process begins.

In step 962, the user may specify sharing options, e.g., to allow other users of server 630, such as a secretary or assistant, to have access to the calendar and/or contacts folders. This may be done by having user interface 150 display a folder ID number, which the user may give to the person sharing the information. That person can then add the shared folder to that person's folders. Alternatively, that person can provide the folder ID number to an operator to add the shared folder. In step 964, the user may select privacy settings, by which the user may indicate a desire to keep the operator from viewing the information in the folders. This information is transmitted from user interface 150 to server 630.

Finally, in step 970, the user can set the synchronization schedule, which was previously shown in FIG. 4B and was described as specifying synchronization to occur at a particular date and time, upon the occurrence of an event, or at periodic intervals, or to specify exceptions to such a schedule. This information is transmitted from user interface 150 to synchronization application 120. Once these steps are taken, the user is ready to synchronize the databases, as indicated by step 999.

Additional advantages and modifications of the invention will readily occur to those skilled in the art. For example, the server with which a device is being synchronized does not have to be a web-based server—it can be accessible via a dial-up service or a local area network. In addition, synchronization does not have to occur between a server and a device—it can occur between any two devices, such as between a PDA and a PC or between a wireless phone and a handheld computer. Synchronization can also occur between two similar devices, such as between two Palm® handheld devices. Moreover, the two devices being synchronized may be connected to each other directly, such as via a serial or parallel cable, or may communicate wirelessly, via wireless modems to a network, or more directly via, e.g., an infrared link.

Information/call center 601 is disclosed herein in a form in which various functions are performed by discrete functional blocks. However, any one or more of these functions could equally well be embodied in an arrangement in which the functions of any one or more of those blocks or, indeed, all of the functions thereof are realized, for example, by one or more appropriately programmed processors.

Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

What is claimed is:

1. A method for use in a first device to configure a second device to perform data synchronization with the first device in a directory assistance system, said method comprising the steps of:

storing at a directory assistance system personal contacts connection information in a folder associated with a user;

receiving a communication at said directory system from said user, wherein a profile including said folder associated with said user is identified by said system using a code identifying said user;

as part of said received communication, receiving a request for synchronization of a second set of personal contacts connection information from a personal information manager (PIM) of said user with said personal contacts connection information in said folder at said system associated with said user;

transmitting to the second device from a first device at said system, via a communication connection, instructions for generating a web-based user interface on the second device, said web-based user interface for use on said second device being the same interface as used on said first device, the user interface being programmed to elicit from a user at the second device information identifying said personal information manager (PIM) used on the second device, and to transmit the information to the first device at said system via the communication connection; and providing to the second device via the communication connection a synchronization package based on the PIM-identifying information where the PIM-identifying information is determined by the user interface by detecting settings on the second device, the synchronization package including a synchronization application, the synchronization application being installed on the second device to be utilized via said web-based user interface, the web-based user interface also being programmed to elicit from the user synchronization information regarding data to be synchronized, and to provide the synchronization information to the synchronization application installed on the second device from said first device at said system.

2. The method according to claim 1, wherein the synchronization information is provided to the synchronization application via a component object model (COM) interface.

3. The method according to claim 1, wherein the PIM-identifying information is provided by the user.

4. The method according to claim 1, further comprising obtaining by the first device identifying information from the user.

5. The method according to claim 1, wherein the synchronization information comprises folder names and locations.

6. The method according to claim 1, wherein the synchronization information comprises synchronization direction and synchronization schedule.

7. The method according to claim 1, wherein the first device is a server.

8. The method according to claim 7, wherein the server is network-based.

9. The method according to claim 8, wherein the network is the Internet.

10. The method according to claim 8, wherein the network is a local area network.

11. The method according to claim 8, wherein the network is the public switched telephone network.

12. The method according to claim 7, wherein the server is accessed through an information assistance service.

13. The method according to claim 1, wherein the first and second devices are connected to each other.

14. The method according to claim 1, wherein the first and second devices communicate with each other wirelessly.

15. An apparatus at a directory assistance system for configuring a device to perform data synchronization with the apparatus, comprising:

A database at said directory assistance system for storing personal contacts connection information in a folder associated with a user;

An interface at said directory assistance system for receiving a communication at said directory system from said user, wherein a profile including said folder associated with said user is identified by said system using a code identifying said user, wherein as part of said received communication, receiving a request for synchronization of a second set of personal contacts connection information from a personal information manager (PIM) of said user with said personal contacts connection information in said folder at said system associated with said user;

a communication interface for transmitting from the system to the device, via a communication connection, instructions for generating a web-based user interface on the device, said web-based user interface for use on said device being the same interface as used on said apparatus, the user interface being programmed to elicit from a user at the device information identifying said personal information manager (PIM) used on the device, and to transmit the information to the apparatus at said system via the communication connection; and a processor for providing to the device via the communication connection a synchronization package based on the PIM-identifying information where the PIM-identifying information is determined by the user interface by detecting settings on the second device, the synchronization package including a synchronization application, the synchronization application being installed on the device to be utilized via said web-based interface, the web-based user interface also being programmed to elicit from the user synchronization information regarding data to be synchronized, and to provide the synchronization information to the synchronization application installed on the device from said apparatus at said system.

16. The apparatus according to claim 15, wherein the synchronization information is provided to the synchronization application via a component object model (COM) interface.

17. The apparatus according to claim 15, wherein the PIM-identifying information is provided by the user.

18. The apparatus according to claim 15, wherein identifying information is obtained from the user.

19. The apparatus according to claim 15, wherein the synchronization information comprises folder names and locations.

20. The apparatus according to claim 15, wherein the synchronization information comprises synchronization direction and synchronization schedule.

21. The apparatus according to claim 15, wherein the apparatus is a server.

22. The apparatus according to claim 21, wherein the server is network-based.

23. The apparatus according to claim 22, wherein the network is the Internet.

24. The apparatus according to claim 22, wherein the network is a local area network.

25. The apparatus according to claim 22, wherein the network is the public switched telephone network.

26. The apparatus according to claim 21, wherein the server is accessed through an information assistance service.

27. The apparatus according to claim 15, wherein the apparatus and the device are connected to each other.

28. The apparatus according to claim 15, wherein the apparatus and the device communicate with each other wirelessly.

* * * * *